(12) United States Patent
Kim et al.

(10) Patent No.: US 11,765,524 B1
(45) Date of Patent: Sep. 19, 2023

(54) HEARING AID WITH VARIABLE NUMBER OF CHANNELS AND METHOD OF SWITCHING NUMBER OF CHANNELS OF HEARING AID

(71) Applicant: Korea Photonics Technology Institute, Gwangju (KR)

(72) Inventors: Seon Man Kim, Gwangju (KR); Kwang Hoon Lee, Anyang-si (KR)

(73) Assignee: Korea Photonics Technology Institute, Gwangju (KR)

( * ) Notice: Subject to any disclaimer, the term of this patent is extended or adjusted under 35 U.S.C. 154(b) by 0 days.

(21) Appl. No.: 18/196,047

(22) Filed: May 11, 2023

Related U.S. Application Data (63) Continuation of application No. PCT/KR2020/016597, filed on Nov. 23, 2020.

(30) Foreign Application Priority Data

Nov. 12, 2020 (KR) .................. 10-2020-0150901

(51) Int. Cl.
*H04R 25/00* (2006.01)
*H04S 3/00* (2006.01)

(52) U.S. Cl.
CPC ......... *H04R 25/505* (2013.01); *H04R 25/604* (2013.01); *H04R 25/609* (2019.05);
(Continued)

(58) Field of Classification Search
CPC . G10L 21/0208; G10L 19/02; G10L 19/0204; H04R 1/1083
(Continued)

(56) References Cited

U.S. PATENT DOCUMENTS 10,042,038 B1 * 8/2018 Lord ................. G10L 25/51
11,694,678 B2 * 7/2023 Lee ................. G10L 25/78
704/232

(Continued)

FOREIGN PATENT DOCUMENTS

| KR | 100253539 B1 | 4/2000 |
| KR | 101248125 B1 | 3/2013 |
| KR | 101903374 B1 | 11/2018 |

OTHER PUBLICATIONS

Tomsom Devis, et al., "A low-complexity 3-level filter bank design for effective restoration of audibility in digital hearing aids", Article in Biomedical Engineering Letters, Jul. 29, 2020, vol. 10, No. 4, pp. 593-601.

(Continued)

*Primary Examiner* — Alexander Krzystan
(74) *Attorney, Agent, or Firm* — Dinsmore & Shohl LLP; Yongsok Choi, Esq.

(57) ABSTRACT

A hearing aid with the variable number of channels includes: a microphone that receives a sound signal; an AD converter that converts the sound signal input from the microphone into a digital signal and outputs the converted digital signal; a controller that determines a filter bank channel for processing the digital signal output from the AD converter; a buffer unit that delays the digital signal based on the determined filter bank channel; a signal processor that includes at least one filter bank channel, synthesizes the digital signal using the determined filter bank channel and outputs the synthesized digital signal; a DA converter that converts the digital signal into the sound signal and outputs the converted sound signal; and a speaker that outputs the sound signal output from the DA converter, in which the controller determines the filter bank channel for processing the digital signal based on a preset condition.

8 Claims, 8 Drawing Sheets

(52) U.S. Cl.
CPC .......... *H04S 3/008* (2013.01); *H04R 2225/41* (2013.01); *H04S 2400/01* (2013.01)

(58) Field of Classification Search
USPC .......................... 381/94.3, 94.2, 317; 700/94
See application file for complete search history.

(56) References Cited

U.S. PATENT DOCUMENTS

| | | | |
|---|---|---|---|
| 2010/0189293 A1 | 7/2010 | Imamura et al. | |
| 2019/0066713 A1* | 2/2019 | Mesgarani | G10L 17/26 |
| 2020/0150919 A1 | 5/2020 | Rand | H04R 1/406 |
| 2021/0020189 A1* | 1/2021 | Jukic | G10L 15/22 |
| 2022/0369031 A1* | 11/2022 | Lester | G10L 21/0232 |

OTHER PUBLICATIONS

Office Action of KR Patent Application No. 10-2020-0150901 dated Feb. 18, 2022.

* cited by examiner

| CONDITION | CHANNEL |
|---|---|
| 1 | 8-channel |
| 2 | 16-channel |
| 3 | 32-channel |

HEARING AID WITH VARIABLE NUMBER OF CHANNELS AND METHOD OF SWITCHING NUMBER OF CHANNELS OF HEARING AID

CROSS-REFERENCE TO RELATED APPLICATIONS

This application is a continuation of International Application No. PCT/KR2020/016597 filed on Nov. 23, 2020, which claims priority to Korean Patent Application No. 10-2020-0150901 filed on Nov. 12, 2020, the entire contents of which are herein incorporated by reference.

TECHNICAL FIELD

The present invention relates to a hearing aid with the variable number of channels and a method of switching the number of channels of a hearing aid.

BACKGROUND ART

Human hearing is damaged for various reasons, such as diseases occurring in an auditory organ, such as otitis media, long exposure to noise environments, aftereffects of various accidents, and aging, resulting in hearing loss. The number of patients with hearing loss due to these problems is increasing, and the demand for hearing aids for these patients is also increasing.

According to the World Health Organization (WHO), there will be 1.2 billion people over the age of 60 by 2025. In particular, it is estimated that 25% of those aged 65 to 75 years old and 70% to 80% of those aged 75 years or older will show hearing impairment due to aging, and thus, it may be expected that an adoption rate of hearing aids among the elderly population will continue to increase.

However, while vision and dental related markets are growing rapidly, the hearing aid market is still in its infancy, highly dependent on foreign technology.

Although the hearing aid is a high value-added medical device with a high selling price compared to cost, domestic companies are having difficulty commercializing a hearing aid due to the preoccupation of patents for hearing aid chips (CHIP) by foreign companies.

In addition, domestic industries have no choice but to focus on sales competition instead of R&D competition due to the preoccupation of patents for hearing aid chips by foreign companies. As a result, most manufacturers rely on simple assembly by importing major parts, so technology development for fostering the domestic hearing aid industry is urgently needed.

The content described in this section merely provides background information for the present embodiment and does not constitute the related art.

SUMMARY OF THE INVENTION

Technical Problem

The present invention provides a hearing aid with the variable number of channels and a method of switching the number of channels of a hearing aid.

Technical Solution

According to an aspect of the present disclosure, a hearing aid with the variable number of channels includes: a microphone that receives a sound signal; an AD converter that converts the sound signal input from the microphone into a digital signal and outputs the digital signal; a controller that determines a filter bank channel for processing the digital signal output from the AD converter; a buffer unit that delays the digital signal based on the determined filter bank channel; a signal processor that includes at least one filter bank channel, synthesizes the digital signal using the determined filter bank channel and outputs the synthesized digital signal; a DA converter that converts the digital signal output from the signal processor into the sound signal and outputs the converted sound signal; and a speaker that outputs the sound signal output from the DA converter, in which the controller determines the filter bank channel for processing the digital signal based on a preset condition.

The preset condition may include at least one of a type of surrounding environment and surrounding noise power of the hearing aid with the variable number of channels.

The controller may perform a deep learning process of determining the surrounding environment by analyzing surrounding noise input from the microphone.

The controller may determine the filter bank channel based on a condition previously input from a user.

The signal processor may include a first filter bank channel and a second filter bank channel, and the number of second filter bank channels may be an integer multiple of the number of first filter bank channels.

The number of second filter bank channels may be twice the number of first filter bank channels.

The number of first filter bank channels may be 8 or 6.

The controller may control to process the digital signal using the first filter bank channel under a first condition, and control to process the digital signal using the second filter bank channel under a second condition, and the first condition and the second condition may be different conditions.

The controller may fix a delay time of the digital signal and store an algorithm of the at least one filter bank channel.

According to another aspect in the present disclosure, a method of switching number of channels of hearing aid includes: receiving a sound signal; converting the input sound signal into a digital signal and outputting the converted digital signal; determining a filter bank channel for processing the digital signal based on a preset condition; delaying the digital signal based on the determined filter bank channel; synthesizing and outputting the digital signal using the determined filter bank channel, the determined filter bank being one of a plurality of filter banks; and converting the output digital signal into the sound signal and outputting the converted sound signal.

Advantageous Effects

As described above, according to one aspect of the present invention, it is possible to change the channel of hearing aids according to a level of noise in the environment.

In addition, according to one aspect of the present invention, it is possible to use a hearing aid with a small number of channels in a quiet environment. Accordingly, power consumption of a hearing aid is lowered, so it is possible to save a battery of a hearing aid and use the hearing aid for a longer time.

In addition, according to an aspect of the present invention, it is possible to implement a variable multi-channel hearing aid with a low delay rate (or a fixed delay rate) in real time.

DETAILED DESCRIPTION

The present invention may be variously modified and have several exemplary embodiments. Therefore, specific exemplary embodiments of the present invention will be illustrated in the accompanying drawings and be described in detail. However, it is to be understood that the present invention is not limited to a specific exemplary embodiment, but includes all modifications, equivalents, and substitutions without departing from the scope and spirit of the present invention. In describing each drawing, similar reference numerals are used for similar components.

Terms used in the specification, "first," "second," "A," "B" etc., may be used to describe various components, but the components are not to be interpreted to be limited to the terms. The terms are used only to distinguish one component from another component. For example, a 'first' component may be named a 'second' component and the 'second' component may also be similarly named the 'first' component, without departing from the scope of the present disclosure. A term 'and/or' includes a combination of a plurality of related described items or any one of the plurality of related described items.

It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element interposed therebetween.

Terms used in the present specification are used only in order to describe specific exemplary embodiments rather than limiting the present invention. Singular forms are intended to include plural forms unless the context clearly indicates otherwise. It should be understood that terms such as "include" or "have" in this application do not preliminarily exclude the presence or addition of features, numbers, steps, operations, components, parts, or combinations thereof described in the specification.

Unless indicated otherwise, it is to be understood that all the terms used in the specification including technical and scientific terms have the same meaning as those that are generally understood by those who skilled in the art.

Terms generally used and defined by a dictionary should be interpreted as having the same meanings as meanings within a context of the related art and should not be interpreted as having ideal or excessively formal meanings unless being clearly defined otherwise in the present specification.

In addition, each configuration, process, process, method, etc., included in each embodiment of the present invention may be technically shared within a range that does not contradict each other.

The present invention relates to a hearing aid or a hearing aid device capable of recognizing a surrounding acoustic environment and changing the number of channels accordingly.

In this case, the number of channels of the hearing aid means the number of frequency domains in which audible frequencies are divided into several frequency bands, and in each domain, and functions such as independent volume control, compression control, noise reduction, and feedback cancellation may be performed in each area, that is, the filter bank channel.

The reason for using a hearing aid is to correct hearing ability with hearing loss close to normal. In particular, since individual hearing ability is different, accurate correction may be made by finely dividing and adjusting the audible frequency band as the number of filter bank channels increases.

In other words, the more the number of frequency channels that the filter bank may separate increases, the more accurate the correction for the hearing loss of the hearing loss patient. On the other hand, the larger the number of frequency channels the filter bank may separate, the longer the signal processing time, resulting in sound distortion.

In the case of using a hearing aid with the variable number of channels according to an embodiment of the present invention, all of these problems can be solved.

In recent years, the hearing aid may use 2 to 64 channels in a multi-channel format.

More specifically, an entry-level hearing aid may have 2 to 4 channels, a general hearing aid may have 6 to 8 channels, and a high-end hearing aid may have 12 to 16 channels. In addition, in recent years, hearing aids of 24 channels to 48 channels or higher than 64 channels and 102 channels are being commercialized.

However, the optimal number of channels may be changed according to users and environment. That is, a large number of channels may not always improve user satisfaction. In fact, hearing aids with 48 and 64 channels have been released, but hearing aids with 8 to 16 channels are still the most satisfactory in everyday life.

However, in a noisy environment, it is advantageous to increase the frequency resolution by increasing the number of channels when processing noise. Therefore, as the noise increases, the number of filter bank channels increases, and a hearing aid maintaining 8 or 12 channels is required in normal times.

Accordingly, in the present invention, a hearing aid capable of changing the number of channels and a method thereof will be described in detail.

In particular, the differentiation of the present invention compared to the existing technology is as follows.

In the existing hearing aids, the number of filter bank channels is fixed. That is, the existing hearing aid is a single-channel type hearing aid in which a channel is fixed. For example, the hearing aid is a hearing aid that fixes and uses one channel such as 4 channels, 8 channels, 16 channels, 32 channels, and 48 channels.

However, the hearing aid according to an embodiment of the present invention may change the number of channels according to the surrounding environment. For example, a hearing aid according to an embodiment of the present invention has 6 channels, 12 channels, 24 channels, and 48 channels, and a channel selected according to surrounding situations may be used. In addition, as another example, the hearing aid according to an embodiment of the present invention has 8 channels, 16 channels, and 32 channels, and the channel selected according to the surrounding conditions may be used.

In addition, as the number of channels increases, power consumption increases and algorithm time delay increases, resulting in an increase in the price of the hearing aid.

However, the hearing aid according to the embodiment of the present invention uses a small number of channels, such as 8 or 16 channels, to reduce power consumption and reduce the price of the hearing aid when the surrounding situation does not require the use of a large number of channels.

Hereinafter, the present invention will be described in detail through the accompanying drawings.

Figure 1:
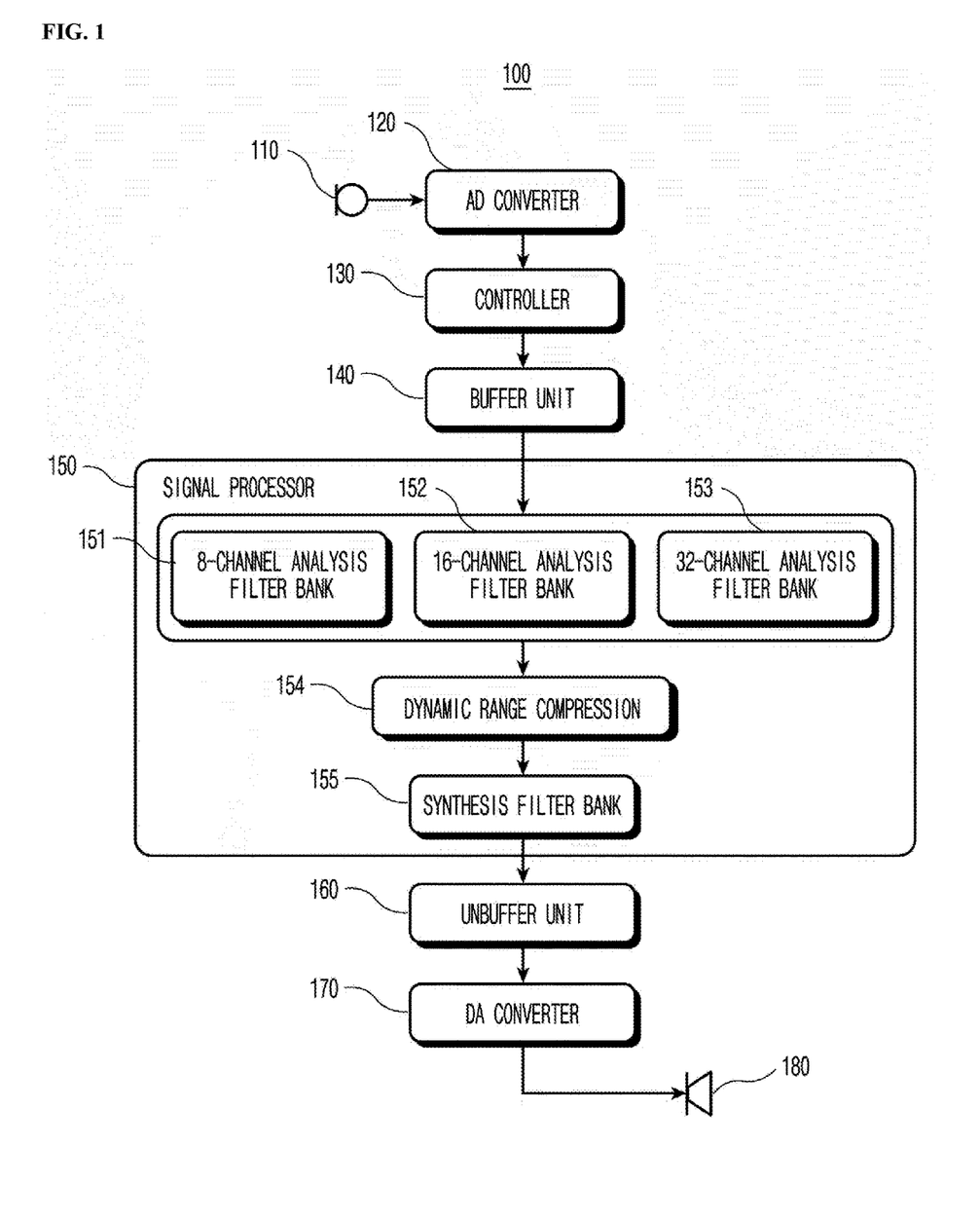
FIG. 1 is a diagram illustrating a configuration of a hearing aid with the variable number of channels according to an embodiment of the present invention.

FIG. 1 is a diagram illustrating a configuration of a hearing aid with the variable number of channels according to an embodiment of the present invention.

A hearing aid 100 with the variable number of channels may include a microphone 110, an AD converter 120, a controller 130, a buffer unit 140, a signal processor 150, an unbuffer unit 160, and a DA converter 170, and a speaker 180.

Here, the microphone 110 may receive a sound signal. The microphone 110 may receive a sound signal (external sound), convert the received sound signal into an electrical signal, and output the converted electrical signal. In particular, an analog signal that may be received by the microphone 110 may include various types of noise as well as the sound signal.

The analog to digital converter (AD converter) 120 may convert the sound signal (analog signal) input from the microphone 110 into a digital signal and output the converted digital signal.

The controller 130 may determine a filter bank channel for processing the digital signal output from the AD converter 120.

In an embodiment of the present invention, the controller 130 may process the digital signal based on a preset condition. Here, the preset condition may include at least one of the type of surrounding environment and surrounding noise power of the hearing aid 100 with the variable number of channels.

In addition, in an embodiment of the present invention, the controller 130 may perform a deep learning process of determining the surrounding environment by analyzing the surrounding noise input from the microphone 110.

Also, in an embodiment of the present invention, the controller 130 may determine the filter bank channel based on a condition previously input from a user.

In addition, in an embodiment of the present invention, the controller 130 may control to process a digital signal using a first filter bank channel under a first condition, and process a digital signal using a second filter bank channel under a second condition.

In addition, in an embodiment of the present invention, the controller 130 may fix the delay time of the digital signal and store an algorithm of at least one filter bank channel.

The buffer unit 140 may delay the digital signal based on the filter bank channel determined by the controller 130. The buffer unit 140 may temporarily store the digital signal received from the AD converter 120. The buffer unit 140 waits for digital data of a preset size to be accumulated and then transmits the digital data at once. The size of data temporarily stored in the buffer unit 140 may be adjusted in various ways according to the specifications and needs of the memory means. The buffer unit 140 may appropriately select how many bandwidths to divide the digital signal to be output into as needed.

That is, in an embodiment of the present invention, the buffer unit 140 may temporarily store the amount of digital data (amount of samples) for delaying a digital signal based on the filter bank channel determined by the controller 130.

The signal processor 150 may include at least one filter bank channel, and may synthesize and output the digital signal using the filter bank channel determined by the controller 130. In addition, the signal processor 150 may include a plurality of channel analysis filter banks (analysis filter banks 151, 152, and 153), a dynamic range compression 154, and a synthesis filter bank 155.

In addition, in an embodiment of the present invention, the signal processor 150 includes a first filter bank channel 151 and a second filter bank channel 152, and the number of second filter bank channels 152 is an integer multiple of the number of first filter bank channels 151. For example, when the number of first filter bank channels 151 is 8, the number of second filter bank channels 152 may correspond to 16. This will be described in detail in the drawings below.

The unbuffer unit 160 may perform the same function as the buffer unit 140. When the input signal is accumulated and data having a certain size is formed, the unbuffer unit 160 may transmit the data to the DA converter 170.

A digital to analog converter (DA converter) 170 may convert the digital signal output from the signal processor 150 into a sound signal which is an analog signal, and output the converted sound signal.

The speaker 180 may output the sound signal output from the DA converter 170. In this case, the speaker 180 may be mounted on the hearing aid and transmit the sound signal output to the user.

Hereinafter, the embodiment of FIG. 1 will be described in more detail. In particular, a general configuration of the hearing aid will be described first before describing the characteristic configuration of the present invention.

Figure 2:
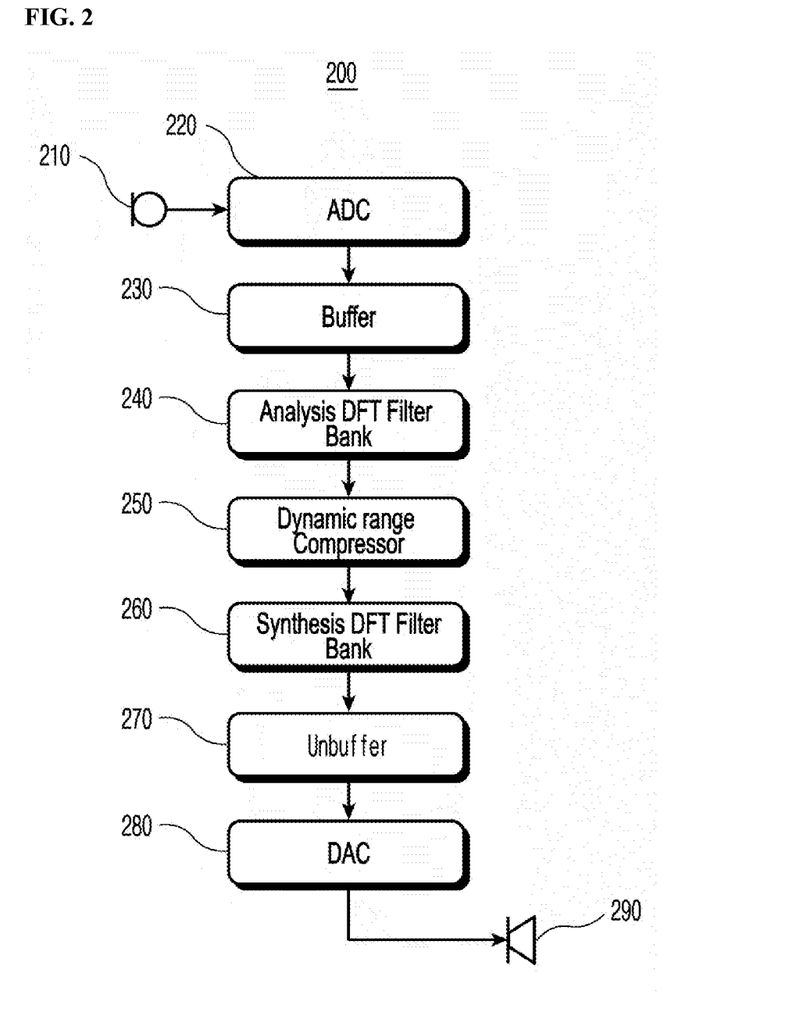
FIG. 2 is a diagram illustrating a general configuration of a hearing aid according to an embodiment of the present invention.

FIG. 2 is a diagram illustrating a general configuration of a hearing aid according to an embodiment of the present invention.

More specifically, a hearing aid 200 may include a microphone 210, an ADC 220, a buffer 230, an analysis filter bank 240, a DRC 250, a synthesis filter bank 260, an unbuffer 270, a DAC 280 and a speaker 290.

The microphone 210 may correspond to the microphone 110 of FIG. 1. That is, the microphone 210 may receive an analog signal.

The ADC 220 may correspond to the AD converter 120 of FIG. 1 as an analog-to-digital converter. In this case, the ADC 220 may convert the received analog signal into digital signals x[0], x[1], x[2], etc.

The buffer 230 may correspond to the buffer unit 140 of FIG. 1. In this case, the buffer 230 may temporarily store the digital signals x[0], x[1], x[2], . . . , x[7], etc., received from the ADC 220 based on a predetermined buffer size.

For example, when using an 8-channel filter bank, a 32 buffer frame size may be required. That is, the buffer 230 may temporarily store data until the number of subframes becomes 32, and then transmit the data to the 8-channel analysis filter bank 240.

That is, the buffer 230 may use a buffer size determined based on the number of discrete Fourier transform (DFT) filter bank channels, and may use the buffer size fixedly. This will be described again in the following drawings.

The following analysis filter bank 240, the DRC 250, and the synthesis filter bank 260 may correspond to the components included in the signal processor 150 of FIG. 1.

The analysis DFT filter bank 240 may process the digital signal received from the buffer 230. Referring to the above example, when the analysis DFT filter bank 240 is an 8-channel filter bank, the 8-channel analysis DFT filter bank 240 may receive and process 32 buffers in subframes.

The DRC 250 may correspond to the dynamic range compression 154 of FIG. 1. The DRC 250 may narrow a range of a signal by reducing a volume of a loud sound and amplifying a quieter sound from the range of the strongest and weakest sounds of the received signal.

The synthesis filter bank 260 may correspond to the synthesis filter bank 155 of FIG. 1. The synthesis filter bank 260 may convert the frequency domain converted through the analysis DFT filter bank 240 back to the time domain. Referring to the above example, the synthesis filter bank 260 may output signals processed through the analysis DFT filter bank 240 and the DRC 250 as output signals y[0], y[1], y[2], y[3], . . . , y[7].

The unbuffer 270 may correspond to the unbuffer unit 160 of FIG. 1. That is, when the input signals are accumulated in the same manner as the function of the buffer 230 to form data having a certain size, the input signals may be transmitted to the DAC 280. That is, the unbuffer 270 may transmit y[0], y[1], y[2], and the like to the DAC 280.

The DAC 280 may be the DA converter 170 of FIG. 1 as the digital-to-analog converter, and the speaker 290 may correspond to the speaker 180 of FIG. 1.

Figure 3:
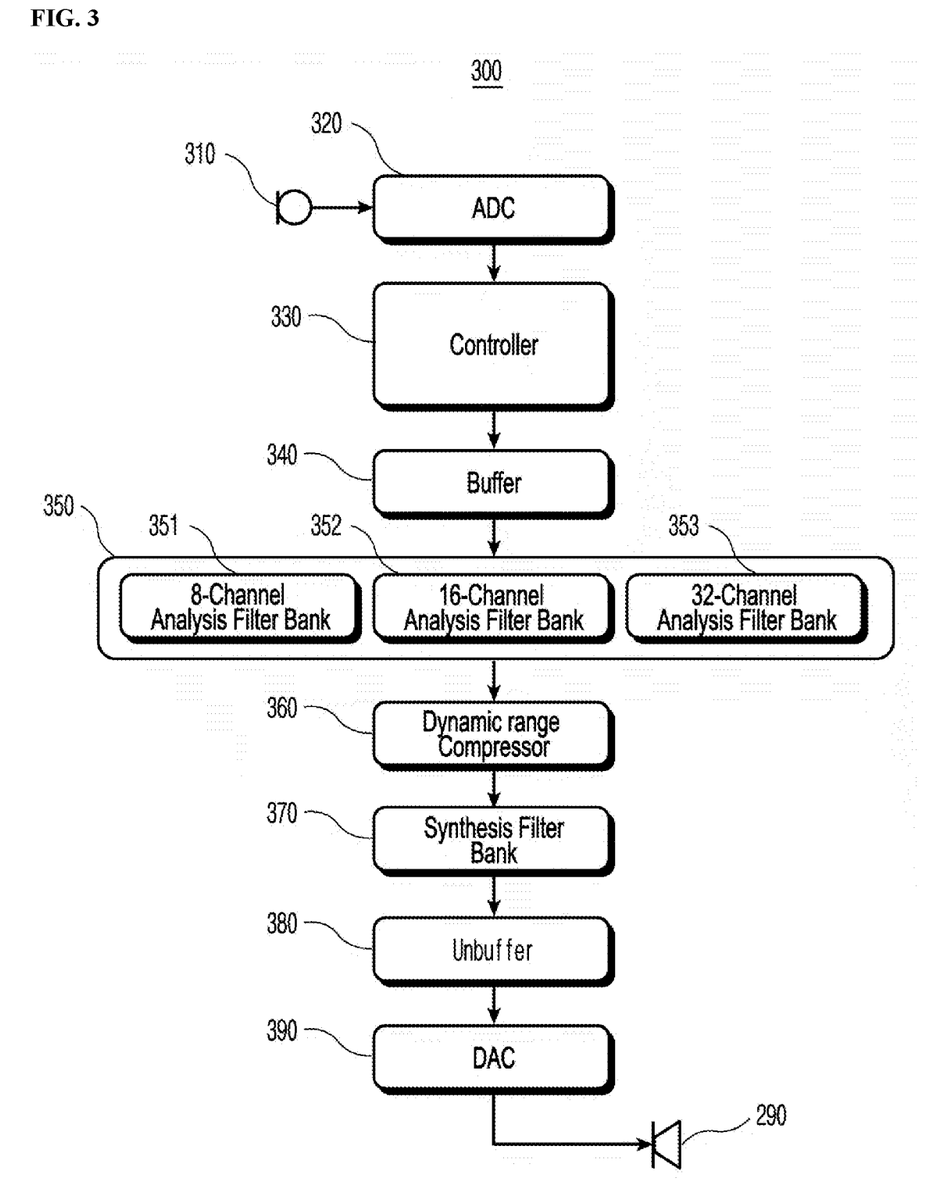
FIG. 3 is a diagram illustrating a configuration of a hearing aid with the variable number of channels according to an embodiment of the present invention.

FIG. 3 is a diagram illustrating a configuration of a hearing aid with the variable number of channels according to an embodiment of the present invention. Hereinafter, a description overlapping with the above description will be omitted.

Referring to FIG. 3, a hearing aid 300 with the variable number of channels may include a microphone 310, an ADC 320, a controller 330, a buffer 340, an analysis filter bank 350, a DRC 360, a synthesis filter bank 370, an unbuffer 380, a DAC 390, and a speaker. An operation performed by components of the hearing aid 300 with the variable number of channels may include the above-described embodiment.

A characteristic configuration according to an embodiment of the present invention will be described in detail with reference to FIG. 3.

More specifically, the microphone 310 may transmit the received sound signal to the ADC 320, and the ADC 320 may convert the received sound signal into the digital signal and transmit the converted sound signal to the controller 330.

The controller 330 may determine the filter bank channel for processing the received digital signal based on a preset condition. Here, the preset condition may include at least one of the type of surrounding environment and the surrounding noise power. That is, the controller 330 may determine the filter bank channel in consideration of the type of surrounding environment and the surrounding noise power based on the received digital signal. The preset conditions will be described in detail with reference to FIG. 4 below.

In the embodiment of FIG. 3, when the analysis filter bank 350 includes an 8-channel analysis filter bank 351, a 16-channel analysis filter bank 352, and a 32-channel analysis filter bank 353, the controller 330 may select one of the three channel analysis filter banks 351, 352, and 353 based on the preset condition.

In an embodiment of the present invention, the hearing aid 300 with the variable number of channels may process the digital signal using the 8-channel analysis filter bank 351 under the first condition, and process the digital signal using the 16-channel analysis filter bank 352 under the second condition.

That is, when the analysis filter bank 350 is determined based on the determination of the controller 330, the buffer 340, the analysis filter bank 350, the DRC 360, the synthesis filter bank 370, and the unbuffer 380 of the hearing aid 300 with the variable number of channels may process the digital signal based on the selected analysis filter banks 351, 352, and 353.

In addition, in an embodiment of the present invention, the controller 330 may fix the delay time of the digital signal and store the algorithms of the 8-channel analysis filter bank 351, the 16-channel analysis filter bank 352, and the 32-channel analysis filter bank 353 for processing the digital signal based on the fixed delay time. A method of processing a digital signal will be described in detail with reference to FIG. 5 below.

In addition, the controller 330 may determine the filter bank channel based on a condition previously input from a user. The conditions previously input by the user will be described in detail with reference to FIGS. 6 and 7 below.

Figure 4:
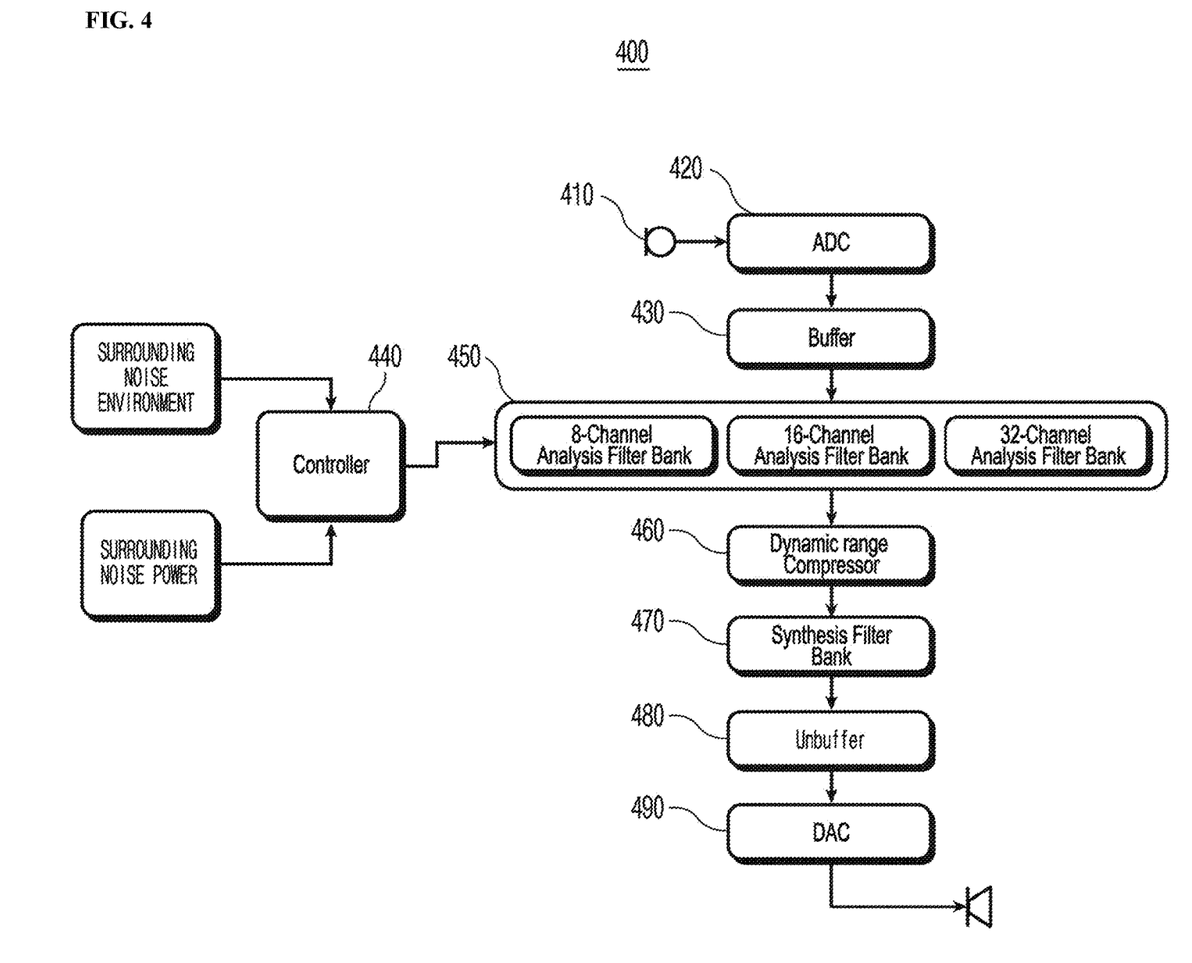
FIG. 4 is a diagram for describing in detail an operation process of a controller of the hearing aid with the variable number of channels according to the embodiment of the present invention.

FIG. 4 is a diagram for describing in detail an operation process of a controller of the hearing aid with the variable number of channels according to the embodiment of the present invention. Hereinafter, a description overlapping with the above description will be omitted.

Referring to FIG. 4, a hearing aid 400 with the variable number of channels may include a microphone 410, an ADC 420, a controller 440, a buffer 430, an analysis filter bank 450, a DRC 460, a synthesis filter bank 470, an unbuffer 480, a DAC 490, and a speaker. An operation performed by components of the hearing aid 400 with the variable number of channels may include the above-described embodiment.

More specifically, the microphone 410 may transmit the received sound signal to the ADC 420, and the ADC 420 may convert the received sound signal into the digital signal and transmit the converted sound signal to the buffer 430. Hereinafter, the converted digital signals may be converted into signals in the frequency domain through the processing in the analysis filter bank 450.

In this case, in an embodiment of the present invention, the controller 440 may select the analysis filter bank 450 that processes the digital signal. The controller 440 may select the analysis filter bank 450 in consideration of at least one of the surrounding noise environment and the surrounding noise power.

Here, the surrounding noise environment may mean the type of surrounding environment. That is, the controller 440 of the hearing aid 400 with the variable number of channels may select the analysis filter bank 450 based on the type of surrounding noise environment. Examples of the surrounding noise environments may include cafes, parks, airports, and bus stops. That is, in general, it may be expected that noise will be low in cafes and parks, and noise will be high in the vicinity of airports or bus stops. Accordingly, the controller 440 may select fewer channels (e.g., 8-channel analysis filter bank 451) for cafes and parks with less noise, and select more channels (e.g., 32-channel analysis filter bank 453) for noisy airports and bus stops.

In this case, the controller 440 may perform a deep learning process of determining the surrounding environment by analyzing the input surrounding noise. More specifically, the controller 440 may repeatedly receive and analyze the sound signal and noise received through the microphone 410 to determine the appropriate number of channels in the surrounding noise environment.

In an embodiment of the invention, the controller 440 may select the analysis filter bank 450 based on the surrounding noise power in addition to the surrounding noise environment. The surrounding noise power may be expressed in decibels (dB). The controller 440 may select many channels (e.g., 32-channel analysis filter bank 453) when the surrounding noise power is strong, and select few channels (e.g., 8-channel analysis filter bank 451) when the surrounding noise power is weak.

In addition, the controller 440 may select the analysis filter bank 450 in consideration of both the surrounding noise environment and the surrounding noise power.

However, the controller 440 may receive the analysis filter bank 450 from the user in addition to the surrounding noise environment and the surrounding noise power. In general, this is because there is the difference in the degree of correction preferred by each user even if the controller 440 selects the filter bank having the appropriate number of channels based on the result of performing the deep learning, the hearing aid 400 with the variable number of channels may determine the analysis filter bank 450 based on the user's input. This will be described once more in FIGS. 6 and 7 below.

Thereafter, when the filter bank channels 451, 452, and 453 are determined based on the determination of the controller 440, the remaining components of the hearing aid 400 with the variable number of channels may process the digital signal based on the selected filter bank channels 451, 452, and 453.

Figure 5A:
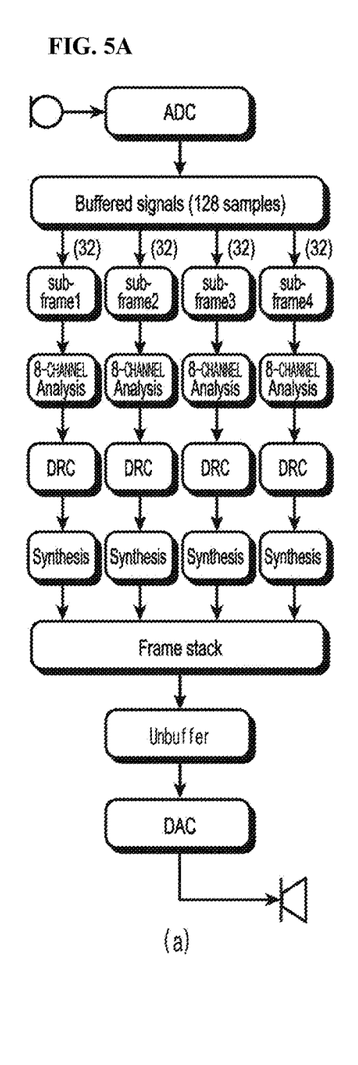
FIGS. 5A, 5B, 5C are diagrams for describing an algorithm of a filter bank of the hearing aid with the variable number of channels according to the embodiment of the present invention.
Figure 5B:
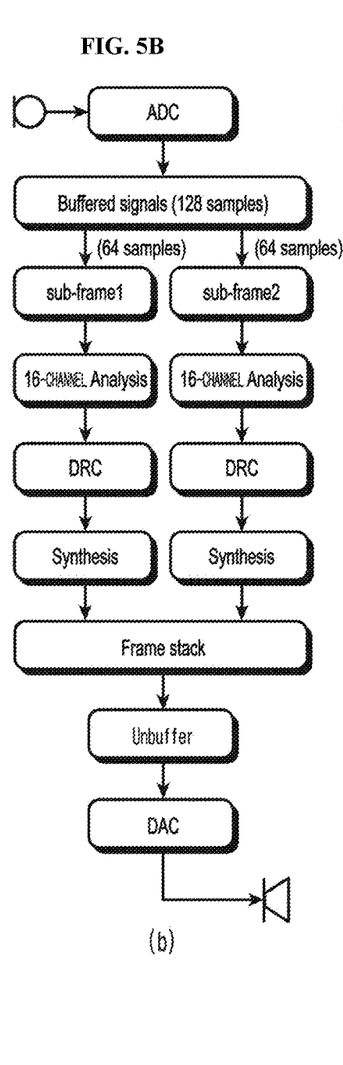
Figure 5C:
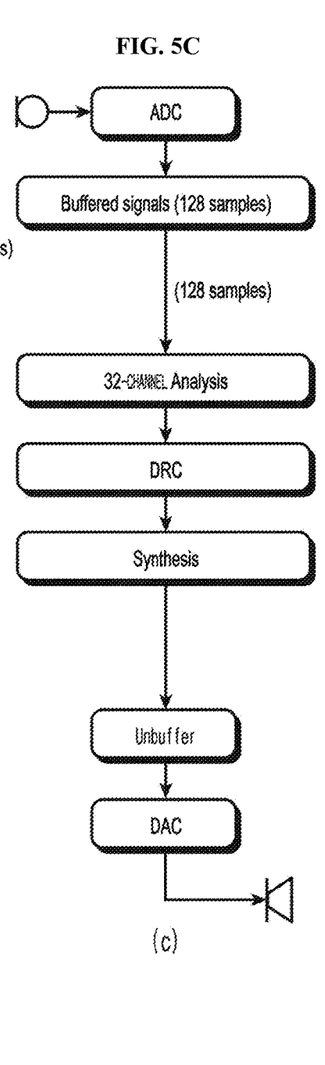

FIGS. 5A, 5B, 5C are diagrams for describing an algorithm of a filter bank of the hearing aid with the variable number of channels according to the embodiment of the present invention. Hereinafter, a description overlapping with the above description will be omitted.

FIG. 5A is a diagram explaining the algorithm of the 8-channel filter bank, FIG. 5B is a diagram for describing the algorithm of the 16-channel filter bank, FIG. 5C is a diagram for describing the algorithm of the 32-channel filter bank.

As described above, according to an embodiment of the present invention, in the case of the hearing aid with the variable number of channels, the number of filter bank channels may be variably selected and used. In particular, in an embodiment of the present invention, the size of the buffer is fixed to fix the algorithm time delay. Hereinafter, it is assumed that the size of the buffer is 128 samples.

Hereinafter, the algorithm of the filter bank according to the selected channel will be described.

Referring to FIG. 5A, when the sound signal is converted into the digital signal and received through the microphone and the ADC, the hearing aid with the variable number of channels (hereinafter, a hearing aid) may delay the time until 128 sample data is received.

Then, when the 8-channel filter bank is selected, the hearing aid may divide 128 samples into 4 subframes. That is, 128 samples may be divided into 32 each in subframe 1, subframe 2, subframe 3, and subframe 4.

Accordingly, the hearing aid may process digital signals of samples included in the divided subframes in the frequency domain by using the 8-channel analysis filter bank. Thereafter, the hearing aid may process the digital signal in the time domain through the synthesis filter bank after going through the DRC process.

That is, when the size of the buffer is fixed at 128 samples, the 8-channel filter bank has to repeat the above process 4 times, and the processed digital signal is accumulated and unbuffered in the frame stack stage to be output as the analog signal the DAC and the speaker.

Similarly, referring to FIG. 5B, when the 16-channel filter bank is selected, the hearing aid may divide 128 samples into 2 subframes. That is, 128 samples may be divided into 64 each in subframe 1 and subframe 2.

Accordingly, the hearing aid may process digital signals of samples included in the divided subframes in the frequency domain by using the 16-channel analysis filter bank. Thereafter, the hearing aid may perform a DRC process on samples included in each subframe and process the digital signal again in the time domain through the synthesis filter bank.

That is, when the size of the buffer is fixed at 128 samples, the 16-channel filter bank has to repeat the above process 2 times, and the processed digital signal is accumulated and unbuffered in the frame stack stage to be output as the analog signal through the DAC.

Referring to FIG. 5C, when the 32-channel filter bank is selected, the 32-channel filter bank may process 128 samples at once without dividing 128 samples into subframes. Accordingly, the hearing aid processes the digital signals of the samples in the frequency domain using the 32-channel analysis filter bank, passes through the DRC, the synthesis filter bank, the unbuffer, and the DAC, and may be output as the analog signal through the speaker.

In addition, in an embodiment of the present invention, in the case of the hearing aid with the variable number of channels having a plurality of filter bank channels and capable of selecting the filter bank channel, the number of controllable filter bank channels may correspond to an integer multiple of each channel number.

More specifically, when the hearing aid with the variable number of channels has a first filter bank channel, a second filter bank channel, and a third filter bank channel, the second filter bank channel is twice as large as the first filter bank channel, and the third filter bank channel may have twice the number of channels of the second filter bank channel.

For example, under the condition that the buffer size corresponding to the 32-channel filter bank is fixed, the number of controllable filter bank channels may correspond to the 16-channel filter bank and the 8-channel filter bank.

In addition, in an embodiment of the present invention, in order to control the 8-channel filter bank, the 16-channel filter bank, and the 32-channel filter bank, the controller may store the algorithms of the 8-channel filter bank, the 16-channel filter bank, and the 32-channel filter bank, respectively.

Figure 6A:
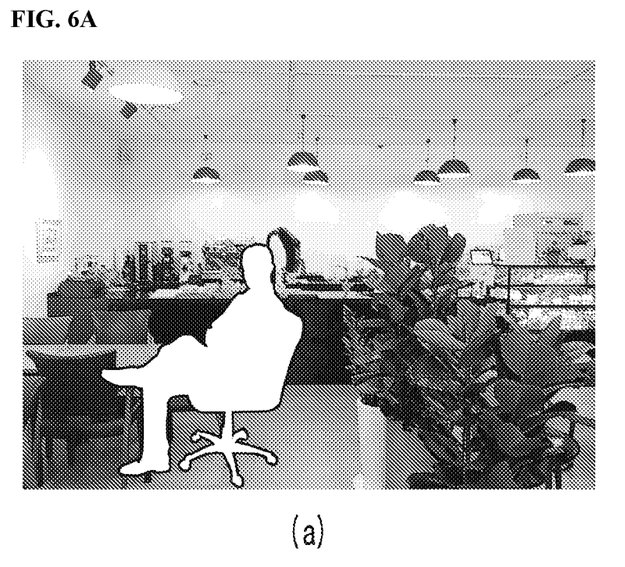
FIGS. 6A and 6B are diagrams for describing a surrounding noise environment of a user using the hearing aid with the variable number of channels according to the embodiment of the present invention.
Figure 6B:
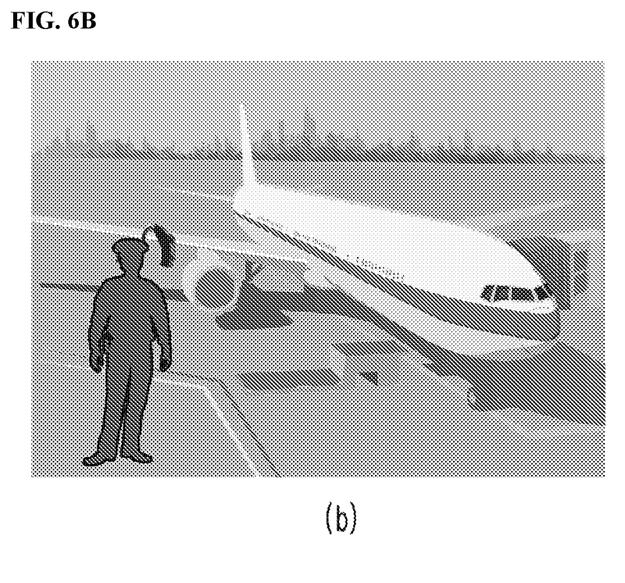

FIGS. 6A and 6B are diagrams for describing a surrounding noise environment of a user using the hearing aid with the variable number of channels according to the embodiment of the present invention.

FIG. 6A is a diagram illustrating an embodiment in which a user sitting in a cafe uses the hearing aid with the variable number of channels according to an embodiment of the present invention, and FIG. 6B is a diagram illustrating an embodiment in which a user guiding driving of an airplane uses the hearing aid with the variable number of channels according to an embodiment of the present invention. An embodiment in which both FIGS. 6A and 6B use the same hearing aid with the variable number of channels may be assumed.

According to an embodiment of the present invention, the hearing aid with the variable number of channels, a filter bank having a plurality of channels may correspond to a state in which a filter bank having a plurality of channels is built-in, and the filter bank may be selectively used based on the surrounding noise environment and the surrounding noise intensity.

For example, even when the same user wears the same hearing aid, the hearing aid may use filter banks having different numbers of channels.

As illustrated in FIG. 6A, when a user is sitting in a cafe, the hearing aid with the variable number of channels may not utilize a large number of channels. Therefore, the hearing aid with the variable number of channels may amplify and process a sound signal using a filter bank with a small number of channels (e.g., 8-channel filter bank) based on the determination of the controller and provide the corrected sound signal to the user.

On the other hand, when a user guides driving of an airplane as illustrated in FIG. 6B, the hearing aid with the variable number of channels needs to utilize a large number of channels. Therefore, the hearing aid with the variable number of channels may amplify and process a sound signal using a filter bank with a large number of channels (e.g., 32-channel filter bank) based on the determination of the controller and provide the corrected sound signal to the user.

Figure 7A:
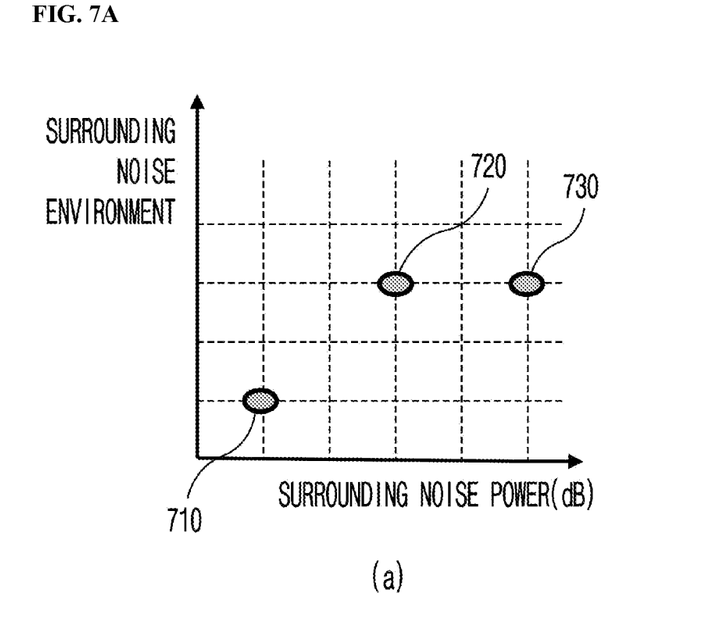
FIGS. 7A and 7B are diagrams illustrating a condition for determining the number of filter bank channels of the hearing aid with the variable number of channels according to the embodiment of the present invention.
Figure 7B:
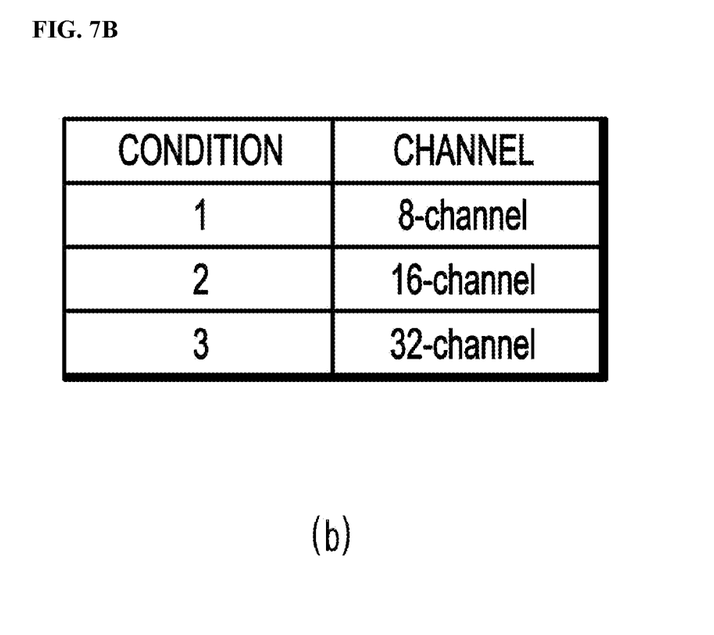

FIGS. 7A and 7B are diagrams illustrating a condition for determining the number of filter bank channels of the hearing aid with the variable number of channels according to the embodiment of the present invention.

FIG. 7A is a diagram illustrating the number of filter bank channels determined based on the surrounding noise power compared to the surrounding noise environment, and FIG. 7B is a diagram illustrating the number of filter bank channels determined based on the previously input conditions.

Referring to FIG. 7A, the controller of the hearing aid with the variable number of channels may determine the filter bank channel in consideration of both the surrounding noise power and surrounding noise environment. More specifically, when the surrounding noise power is 1 dB and the type of surrounding noise environment is a first situation, the controller may determine a first condition 710, and in the case of the first condition 710, control the rest components to amplify and process the signal using the 8-channel filter bank.

In addition, when the surrounding noise power is 3 dB and the type of surrounding noise environment is a second situation, the controller may determine a second condition 720, and in the case of the second condition 720, control the rest components to amplify and process the signal using the 16-channel filter bank.

Similarly, when the surrounding noise power is 5 dB and the type of surrounding noise environment is the third situation, the controller may determine a third condition 730, and in the case of the third condition 730, control the rest components to amplify and process the signal using the 32-channel filter bank.

That is, the controller may store the corresponding condition based on the values/ranges of the surrounding noise power and the surrounding noise environment therein, and may determine the number of filter bank channels in advance based on the condition.

In addition, referring to FIG. 7B, the controller may use the 8-channel filter bank for the first condition, use the 16-channel filter bank for the second condition, and use the 32-channel filter bank for the third condition. In an embodiment of the present invention, the controller may receive the first condition, the second condition, and the third condition in advance. The channels of the filter bank according to these conditions may be input to the controller at the time of manufacture, and may be input and set by the user after use.

For example, the user may set the controller to use the 8-channel filter bank under the first condition, the 16-channel filter bank under the second condition, and the 32-channel filter bank under the third condition.

In addition, although the above-described embodiment has been described by taking the 8-channel filter bank, the 16-channel filter bank, and the 32-channel filter bank as examples, it can also be applied to the 6-channel filter bank, the 12-channel filter bank, and the 24-channel filter bank.

Figure 8:
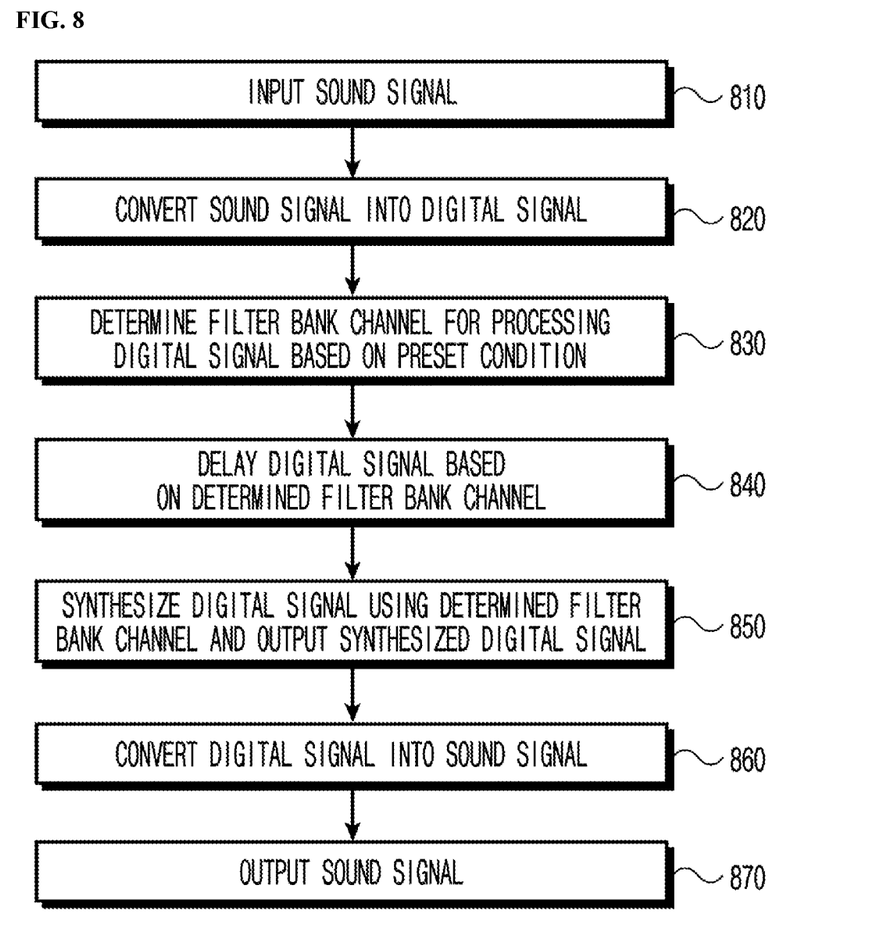
FIG. 8 is a flowchart for describing a method of switching number of channels of hearing aid according to an embodiment of the present invention.

FIG. 8 is a flowchart for describing a method of switching number of channels of hearing aid according to an embodiment of the present invention.

In step S810, the microphone may receive a sound signal.

In step S820, the analog-to-digital converter may convert the input sound signal into the digital signal and output the converted digital signal.

In step S830, the controller may determine the filter bank channel for processing the digital signal based on the preset condition. Here, the preset condition may include at least one of the surrounding environment type and the surrounding noise power. In addition, the controller may perform a deep learning process of determining the surrounding environment by analyzing surrounding noise input from the microphone. In addition, the controller may determine the filter bank channel based on the condition previously input from the user. For example, in the case where the user sets the 8-channel filter bank to be used in the first condition, when the controller determines the first condition in consideration of the type of surrounding noise environment and the surrounding noise power, the signal may be processed through the 8-channel filter bank. In addition, when the filter bank that may be selected by the controller is the first filter bank, the second filter bank, and the third filter bank, the number of second filter bank channels is twice that of the first filter bank and the number of third filter bank channels is twice that of the second filter bank. Also, the number of first filter bank channels is 8 or 6. In addition, the controller may fix the delay time of the digital signal and store the algorithm of at least one filter bank channel used.

In step S840, the buffer unit may delay the digital signal based on the determined filter bank channel.

In step S850, the signal processor may synthesize and output the digital signal using the determined filter bank channel. In this case, the determined filter bank is one of a plurality of filters.

In step S860, the digital to analog converter may convert the output digital signal into the sound signal and output the converted sound signal.

In step S870, the speaker may output the converted sound signal.

Although each process is described as sequentially executed in FIG. 8, this is merely an example of the technical idea of one embodiment of the present invention. Since those skilled in the art to which an embodiment of the present invention pertains may change and execute the sequence shown in FIG. 8 within the range not departing from the essential characteristics of the embodiment of the present invention, and one or more of each process may be applied in parallel with various modifications and variations, FIG. 8 is not limited to a time-series sequence.

Meanwhile, the processes illustrated in FIG. 8 may be implemented as a computer readable code in a computer readable recording medium. The computer-readable recording medium may include all kinds of recording apparatuses in which data that may be read by a computer system are stored. That is, the computer-readable recording medium includes storage media such as magnetic storage media (eg, a read-only memory (ROM), a floppy disk, a hard disk, etc.) and optically readable media (e.g., a compact disc read-only memory (CD-ROM), a digital video disc (DVD), etc.). In addition, the computer readable recording media may be distributed in computer systems connected to each other through a network, such that the computer readable codes may be stored and executed in the computer readable recording media in a distributed scheme.

The spirit of the present embodiment is illustratively described hereinabove. It will be appreciated by those skilled in the art to which the present embodiment pertains that various modifications and alterations may be made without departing from the essential characteristics of the present embodiment. Accordingly, the present embodiments are not to limit the spirit of the present embodiment, but are to describe the spirit of the present disclosure. The technical idea of the present embodiment is not limited to these embodiments. The scope of the present disclosure should be interpreted by the following claims, and it should be interpreted that all the spirits equivalent to the following claims fall within the scope of the present disclosure.

The present patent is the result of research conducted with the support of the National Research Foundation with financial resources from the Korean government (Ministry of Science and ICT) in 2020 (Project Unique Number: 1711108052, Project Title: The hearing aid speech intelligibility enhancement system development based on the deep neural network-noise reduction according to the online objective measure of speech intelligibility).

The invention claimed is:

1. A hearing aid with a variable number of channels, comprising:
   a microphone that receives a sound signal;
   an AD converter that converts the sound signal input from the microphone into a digital signal and outputs the digital signal;
   a controller that fixes a delay time of the digital signal based on a size of a buffer unit, stores an algorithm of a filter bank channel for processing the digital signal based on the fixed delay time, and determines a filter bank channel for processing the digital signal output from the AD converter;
   a buffer unit that temporarily stores the digital signal received from the AD conversion unit, waits until digital data of a preset size is accumulated and then outputs the digital data at once, and delays the digital signal based on the determined filter bank channel;
   a signal processor that includes at least one filter bank channel, synthesizes the digital signal using the determined filter bank channel and outputs the synthesized digital signal;
   a DA converter that converts the digital signal output from the signal processor into the sound signal and outputs the converted sound signal; and
   a speaker that outputs the sound signal output from the DA converter,
   wherein the controller analyzes surrounding noise input from the microphone to determine a type of surrounding environment,
   determines the filter bank channel for processing the digital signal based on the type of surrounding environment or surrounding noise power,
   determines the filter bank channel as a first filter bank channel when the surrounding noise power is smaller than a reference decibel value or the type of surrounding environment is an environment in which noise is expected to be low, and
   determines the filter bank channel as a second filter bank channel using a larger number of channels than that of the first filter bank channel when the surrounding noise power is greater than the reference decibel value or the type of surrounding environment is an environment in which noise is expected to be high, and
   the number of channels of the filter bank channel is the number of frequency domains in which audible frequencies are divided into several frequency bands.

2. The hearing aid of claim 1, wherein the controller performs a deep learning process of determining the surrounding environment by analyzing the surrounding noise input from the microphone.

3. The hearing aid of claim 1, wherein the controller determines the filter bank channel based on a condition previously input from a user.

4. The hearing aid of claim 1, wherein the signal processor includes the first filter bank channel and the second filter bank channel, and a number of second filter bank channels is an integer multiple of the number of first filter bank channels.

5. The hearing aid of claim 4, wherein the number of second filter bank channels is twice the number of first filter bank channels.

6. The hearing aid of claim 4, wherein the number of first filter bank channels is 8 or 6.

7. The hearing aid of claim 4, wherein the controller controls to process the digital signal using the first filter bank channel under a first condition, and
   controls to process the digital signal using the second filter bank channel under a second condition, and the first condition and the second condition are different conditions.

8. A method of switching the number of channels of hearing aid, comprising:
   receiving a sound signal;
   converting the received sound signal into a digital signal and outputting the converted digital signal;
   determining a filter bank channel for processing the digital signal based on a preset condition;
   temporarily storing the output digital signal, waiting until digital data of a preset size is accumulated and then outputting the digital data at once, and delaying the digital signal based on the determined filter bank channel;

synthesizing and outputting the digital signal using the determined filter bank channel, the determined filter bank being one of a plurality of filter banks; and converting the output digital signal into the sound signal and outputting the converted sound signal, wherein the determining of the filter bank channel includes:

fixing a delay time of the digital signal based on a size of a buffer unit of the hearing aid, and storing an algorithm of the filter bank channel for processing the digital signal based on the fixed delay time, analyzing surrounding noise input from an outside to determine a type of surrounding environment, determining the filter bank channel for processing the digital signal based on the type of surrounding environment or surrounding noise power, determining the filter bank channel as a first filter bank channel when the surrounding noise power is smaller than a reference decibel value or the type of surrounding environment is an environment in which noise is expected to be low, and determining the filter bank channel as a second filter bank channel using a larger number of channels than that of the first filter bank channel when the surrounding noise power is greater than the reference decibel value or the type of surrounding environment is an environment in which noise is expected to be high, and the number of channels of the filter bank channel is the number of frequency domains in which audible frequencies are divided into several frequency bands.

* * * * *